United States Patent [19]

Hartwig

[11] Patent Number: 5,456,416
[45] Date of Patent: Oct. 10, 1995

[54] MIXER

[75] Inventor: Gert Hartwig, Wetaskiwin, Canada

[73] Assignee: Alteen Distributors, Ltd., Alberta, Canada

[21] Appl. No.: 274,467

[22] Filed: Jul. 13, 1994

[51] Int. Cl.$^6$ ................................................ B02C 18/08
[52] U.S. Cl. ................................ 241/260.1; 241/605
[58] Field of Search ............................ 241/186.4, 260.1, 241/101.7, 605

[56] References Cited

U.S. PATENT DOCUMENTS

| | | | |
|---|---|---|---|
| 3,156,451 | 11/1964 | Waas | 259/107 |
| 3,970,255 | 7/1976 | Foster | 241/186.4 |
| 4,003,502 | 1/1977 | Barcell | 222/168 |
| 4,106,706 | 8/1978 | Burrows | 241/186.2 |
| 4,188,132 | 2/1980 | Lenart et al. | 366/314 |
| 4,607,802 | 8/1986 | Lamort | 241/260.1 X |
| 4,838,704 | 6/1989 | Carver | 366/307 |
| 4,938,426 | 7/1990 | Koenig | 241/222 |
| 5,020,918 | 6/1991 | Faccia | 366/279 |
| 5,082,188 | 1/1992 | Urich | 241/56 |
| 5,175,917 | 1/1993 | Faccia | 29/267 |
| 5,207,391 | 5/1993 | Anderson | 241/186.4 |
| 5,240,321 | 8/1993 | Miller | 366/45 |
| 5,379,951 | 1/1995 | Hughes | 241/60 |

*Primary Examiner*—Irene Cuda
*Assistant Examiner*—John M. Husar
*Attorney, Agent, or Firm*—Emrich & Dithmar

[57] ABSTRACT

A mixer is comprised of a substantially circular container tub and includes an auger flighting member extending upwardly within the mixer for engagement with bales of material to cut and shred the bales. The auger flighting member includes a plurality of knife blades mounted on the outer radial edges of the auger flighting portion. The upper end portion of the auger flighting member includes a mounted knife blade, with the upper end portion of the member being bent out of the plane of the auger flighting at an angle of between 15 and 25 degrees. The lower leading edge portion of the auger flighting member includes a kicker plate mounted adjacent the lower leading edge portion to direct the cut material into the auger flighting to facilitate feeding and mixing. The mixer further includes a plurality of wedge deflection members mounted to the interior surface of the container tub to facilitate feeding and mixing within the mixer.

22 Claims, 2 Drawing Sheets

MIXER

BACKGROUND OF THE INVENTION

The present invention relates to a mixer and particularly, to a novel screw or auger flighting structure including an angled cutting knife mounted on the top end portion of the flighting structure, a deflector plate mounted on the lower end portion of the flighting structure, and a novel container tub all which facilitate the cutting, the feeding, and the mixing of the hay bales or other fibrous material in the mixer.

Mixers utilizing a single conical processing screw or auger flighting rotating within a container tub are known in the art. Such auger flightings generally may include cutting knives mounted radially outwardly from the flighting with the upper last turn of the auger flighting portion containing a plurality of knives extending perpendicularly upwardly from the plane of the flighting. The purpose of the perpendicularly extending knives is to cut the raw material bales into smaller pieces or chunks to facilitate mixing of the material by the lower auger flighting portion. However, the perpendicular upward extending knives or blades often times engage the bales of material and bounces the bales off the container tub thereby intercepting the mixing operation.

Furthermore, when such prior art mixers are used to process fibrous materials having a high moisture content, such as wet silage or wet hay, the wet material tends to compact against the wall of the container tub away from the rotating auger flighting thereby ultimately clogging and stalling the mixer.

SUMMARY OF THE INVENTION

One object of the present invention is to provide a mixer having a cutting blade mounted to the upper end portion of the screw or auger flighting.

It is another object of the present invention to provide a novel kicker plate mounted on the lower end portion of the lower screw or auger flighting portion to facilitate mixing within the mixer.

It is a further object of the present invention to provide a mixer having a novel auger flighting structure having a lower flighting portion which substantially extends to the periphery of the floor of the mixer container tub.

It is another further object of the present invention to provide a novel means associated with the sidewalls of the container tub of the mixer to feed the wet cut material into the auger flighting to facilitate the mixing action within the mixer.

It is still another object of the present invention to provide wedge deflector means associated with the sidewalls of the container tub of the mixer to feed the wet cut material into the auger flighting to facilitate mixing.

It is yet another object of the present invention to mount a cutting blade or knife at an angle to the plane of the end portion of the upper flighting portion to facilitate cutting and shredding of the material deposited into the container tub of the mixer.

Another object of the present invention is to provide adjustable wedge deflector means associated with the sidewalls of the mixer container tub to feed cut materials into the auger flighting to facilitate mixing.

A further object of the present invention is to provide a spring biased wedge deflector means associated with the sidewalls of the container tub of the mixer to feed cut material into the auger flighting to facilitate mixing.

Still another object of the present invention is to provide a mixer having a novel auger flighting structure wherein the radial width of the lower auger flighting portion extends to the periphery of the floor of the container tub and is constant until the lower flighting portion intersects a line parallel to the radial width of central and upper flighting portions to facilitate the mixing within the mixer and reduce the power consumption necessary for driving the mixer.

It is yet a further object of the present invention to provide a novel screw or auger flighting structure comprised of a lower auger flighting portion and central and upper flighting portions wherein the radial width of the central and upper flighting portions are constant to form a parallel cylindrical configuration.

It is an object of the present invention to provide at least three wedge members spaced apart and mounted to the sidewalls of the container tub which facilitate feeding the cut material into the auger flighting for mixing within the mixer.

In accordance with the present invention there is provided a mixer which is comprised of a substantially circular container tub having a first end, a second end and sidewalls which extend between the first and second ends. The auger mixer contains at least one screw or auger flighting portion rotating within the container tub and extending upwardly from the floor of the tub. The top of the container tub is open to permit bales of material to be positioned onto the rotating auger flighting to permit the auger flighting to cut the bales into smaller cut pieces to facilitate mixing. Each of the auger flighting portions includes a lower large radial width flighting portion, an intermediate or central flighting portion and an upper flighting portion. Preferably, the radial width or radius of the central and upper flighting portions are constant to provide a parallel cylindrical configuration. The lower large radial width flighting portion substantially extends to the periphery of the floor of the mixer and is constant until it intersects a line substantially parallel to this radial extended from the tangent of the central and upper flighting radius. This structure permits a larger area of the floor of the mixer to be exposed to receive the contents of the mixer after each revolution of the auger flighting portion to provide better chopping and mixing, to provide less overspill when fully loaded, and to provide reduced power requirements of the mixer. An outlet is positioned adjacent one lower end of the container tub to permit removal of the processed and mixed material from the mixer.

In one embodiment of the present invention, a plurality of knife members are replaceably secured to at least the intermediate or central flighting portion and to the upper flighting portion and extend radially outwardly therefrom. The upper flighting portion includes a knife or blade member mounted to the upper trailing end portion. This blade member extends radially outwardly therefrom with the upper trailing end portion of the auger flighting being bent upwardly from the plane of the flighting between 15 to 25 degrees. Such a structure permits the rapid opening and tearing apart of the bales of material deposited into the tub to break the bales into small cut pieces or clumps. When the angle of the cutting blade, mounted on the trailing end portion of the upper flighting portion, is greater than approximately 25 degrees, the knife blade does not radially cut the bales into chucks but instead the knife blade engages the bales and oftentimes throws the bales out of the container tub of the mixer assembly.

In the preferred embodiment of the present invention, the auger flighting structure is structurally arranged within the mixer container tub such that the lower large radial width flighting portion substantially extends to the periphery of the floor of the mixer container tub. Additionally, the lower large radial width flighting portion possesses a constant radius, until the lower flighting portion substantially intersects a line parallel to the radial width of the intermediate and upper flighting portions. Such a structure permits a larger area of the floor of the container tub to be exposed thereby more readily receiving the cut and mixed contents of the mixer to provide a mixer that possesses better chopping and mixing with less overspill when fully loaded.

Additionally, it is preferred that the leading edge of the lower large radial width flighting portion includes a kicker plate mounted at an angle adjacent to the leading edge to feed and direct the material into the auger flighting to facilitate mixing.

In further embodiments of the present invention, a plurality of wedge deflector members are positioned radially about the interior surface of the container tub to facilitate directing the cut pieces of the hay bales or other materials into the rotating auger flighting to facilitate mixing within the mixer. The wedge deflector members may be adjustable or spring biased into the container tub to facilitate the mixing action of the mixer.

Other and further significant objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the present invention providing the same or identical or equivalent principles may be used and structural changes which may be made as desired by those skilled in the art without parting from the scope of the present invention.

DESCRIPTION OF THE DRAWINGS

For facilitating and understanding the present invention, there is illustrated in the accompanying drawings a preferred embodiment thereof, from an inspection of which, when considered in connection with the following description, the invention, its constructions and operation and many of its advantages will be readily understood and appreciated.

DETAILED DESCRIPTION OF THE PREFERRED EMBODIMENTS

Figure 1:
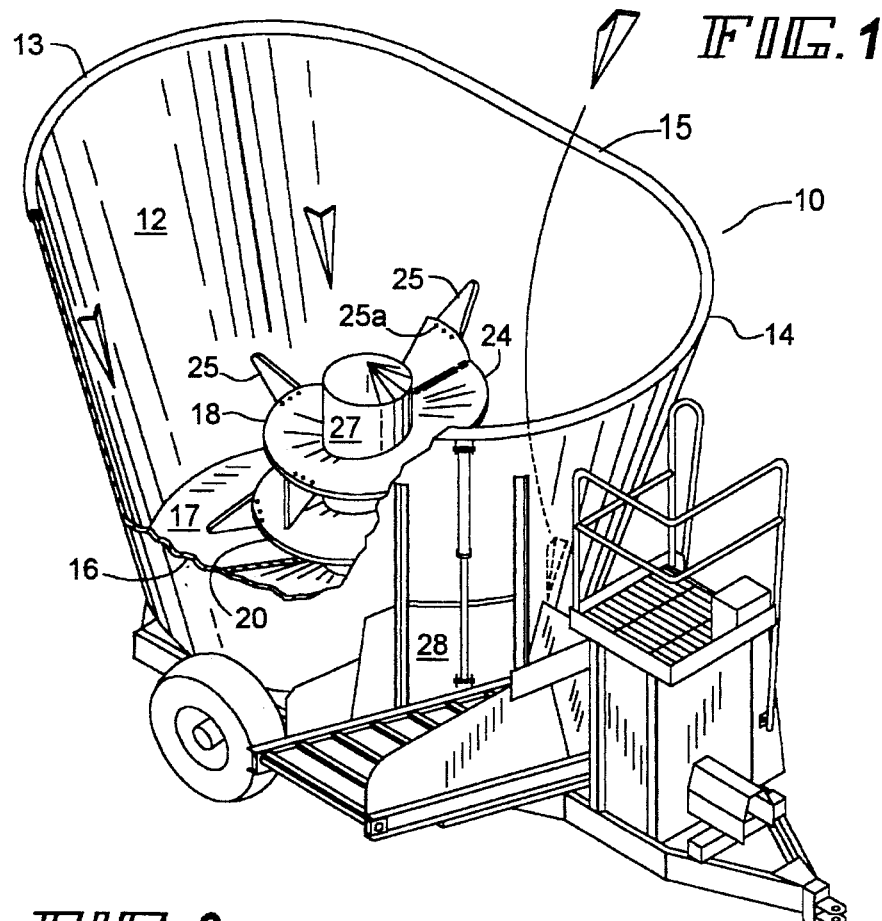
FIG. 1 is a perspective view of a mixer in accordance with the present invention.
Figure 2:
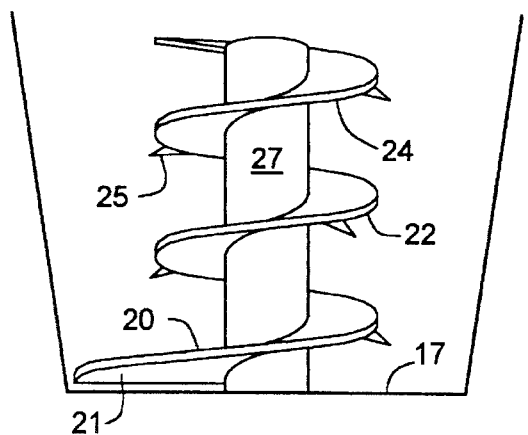
FIG. 2 is a sectional view of the auger flighting portion mounted within the container tub of the mixer in accordance with the present invention.

Referring now to the drawings wherein like numerals have been used throughout the several views to designate the same or similar parts, in FIG. 1, a mixer 10 is illustrated which is comprised of a substantially circular container tub 12 having a first end 13, a second end 14 and sidewalls 15 and 16 which extend between the first and second ends. Preferably, the mixer 10 contains at least one screw or auger flighting portion 18 centrally positioned within the tub 12 and extending upwardly from the bottom or floor 17 within the interior of the tub. As shown in FIG. 2, the auger flighting portion 18 includes a lower flighting portion 20, an intermediate or central flighting portion 22 and an upper flighting portion 24. The central and upper flighting portions each have a radial width which is constant or substantially the same to substantially provide a parallel cylindrical configuration. The term "radial width" is used to describe the radius of the auger flighting extending outwardly from the auger cylinder 27. The lower flighting portion 20 includes a wing extension member 21 which substantially extends outwardly to the periphery of the floor of the mixer 10 and is constant until it intersects a line substantially parallel to a radial extended from the tangent of the central and upper flighting portions radii. This structure of the wing extension member 21 of the lower flighting portion 20 permits a larger area of the floor of the mixer to be exposed to receive the contents of the mixer after each revolution of the auger flighting portion to provide better chopping and mixing, to provide less overspill when fully loaded and to provide reduced power requirements of the mixer.

Figure 3:
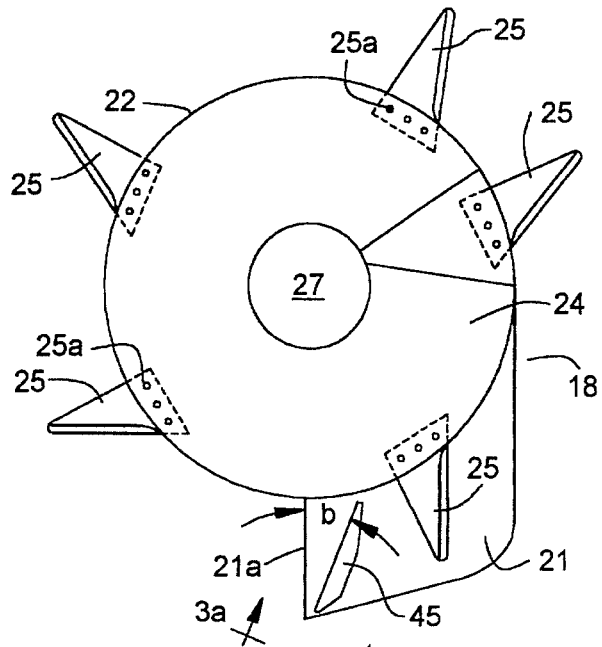
FIG. 3 is a top view of the auger flighting portion illustrating the spiral winding of the auger flighting, the mounting of a kicker plate adjacent to the leading edge of the lower large radial width flighting portion and the mounting of the top most knife member to the upper end portion of the upper flighting portion in accordance with the present invention.

A plurality of knife or blade members 25 are replaceably secured to the outer peripheral edge portions of the central and upper flighting portions, with the knife or blade members extending radially outwardly therefrom, as shown in FIGS. 1–3. The lower flighting portion 20, the central flighting portion 22 and the upper flighting portion 24 are spirally wound about an auger cylinder 27. The auger flighting portion 18 is driven by conventional power means, as is well known in the art. An outlet 28 is provided adjacent one lower end of the container tub 12 to permit removal of the processed and mixed materials from the mixer 10, as is known in the art.

As illustrated in FIGS. 1 and 3, the knife blades 25 are replaceably secured by bolts 25a to the outer edge surfaces of the central and upper flighting portions and extend radially outwardly therefrom. The knife blades 25 engage the baled material that is deposited into the upper open end of the container tub of the mixer to shred and cut the fibrous material.

Figure 4:
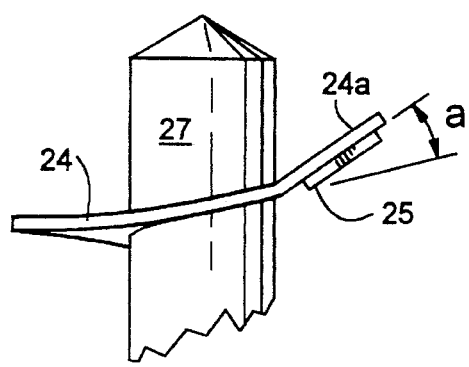
FIG. 4 is a sectional view taken along lines 4—4 in FIG. 3.

As shown in FIG. 4, the upper trailing end portion 24a of the spirally wound upper flighting portion 24 includes a knife or blade member 25 attached to the upper end portion and extending radially outwardly therefrom. The upper trailing end portion 24a of the auger flighting portion is illustrated as being bent upwardly from the plane of the flighting between an angle "a" of 15 to 25 degrees. In such a position, the knife blade 25 is structurally arranged to extend upwardly from the edge of the bent flighting at a predetermined this angle to engage the baled material to cut and shred the bale to facilitate mixing. It has been found that by positioning the upper blade at an angle on the bent flighting permits the rapid opening and tearing apart of the deposited baled material to break the same into small cut pieces and to facilitate mixing within the mixer. When the angle of the knife blade extending from the bent flighting is greater than approximately 25 degrees, the knife blade frequently does not cut the bale into chucks but instead engages the bale and bounces the bale out of the container tub of the mixer assembly. When the angle of the cutting blade is less than approximately 15 degrees, the knife blade does not properly engage the bale to cut the bale into suitable cut pieces. It has been determined that a preferred angle of the knife blade 25 of approximately 22 degrees provides the optimum engagement of the knife blade 25 into the bale of material to cut and shred the bale to facilitate mixing within the mixer.

Figure 5:
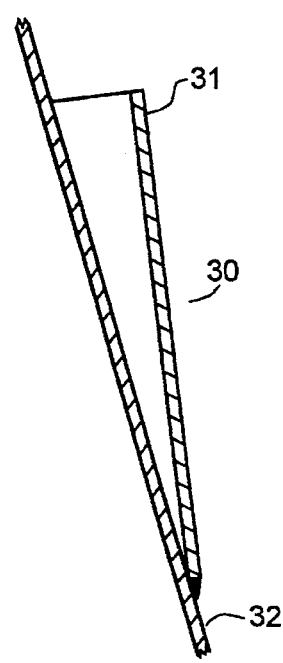
FIG. 5 is a sectional view of a wedge deflector member mounted to the inside surface of the container tube of the mixer in accordance with the present invention.
Figure 6:
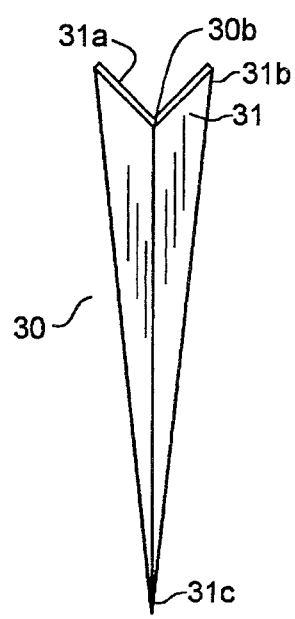
FIG. 6 is a frontal view of the wedge deflector member in accordance with the present invention.

As further illustrated in FIGS. 1 and 5–9, a further embodiment of the present invention includes the mounting of a plurality of wedge deflection members 30 about the interior surface 32 of the container tub 12 to direct the cut pieces or other materials into the rotating auger flighting 18 to facilitate mixing within the mixer 10. The wedge deflection member 30 in the shape of a tapered angled iron that is approximately 12 to 16 inches in length between the junction 30b of the angled iron and the tapered end 30c. When the wedge deflector member 30 is mounted to the interior surface 32 of the container tub, the base end 31 extends inwardly from the interior wall surface of the tub, as shown in FIG. 5, by a distance sufficient to assist feeding and directing the cut material into the rotating flighting 18. Each leg 31a and 31b of the base end 31 is approximately 2 inches in length. It has been determined that by substantially equally spacing three wedge deflectors within and about the interior surface of the container tub substantially facilitates feeding of the cut bale material into the mixer, speeds up the mixing process, and provides optimum feeding and mixing conditions for the mixer. Preferably, the wedge deflectors are about 14 inches in length and are located approximately 11 to 12 inches above the floor 17 of the mixer 10 and equally spaced about the interior surface of the tub. The wedge shaped or prison shaped deflector members 30 have provided excellent feeding and channeling of wet silage and hay bales and the combination of three wedges about the interior surface of the mixer 10 has provided satisfactory and excellent mixing results by deflecting the cut baled material into the center of the tub such that it is engaged by and with the auger flighting portion 18 to be cut and mixed within the mixer.

Figure 7:
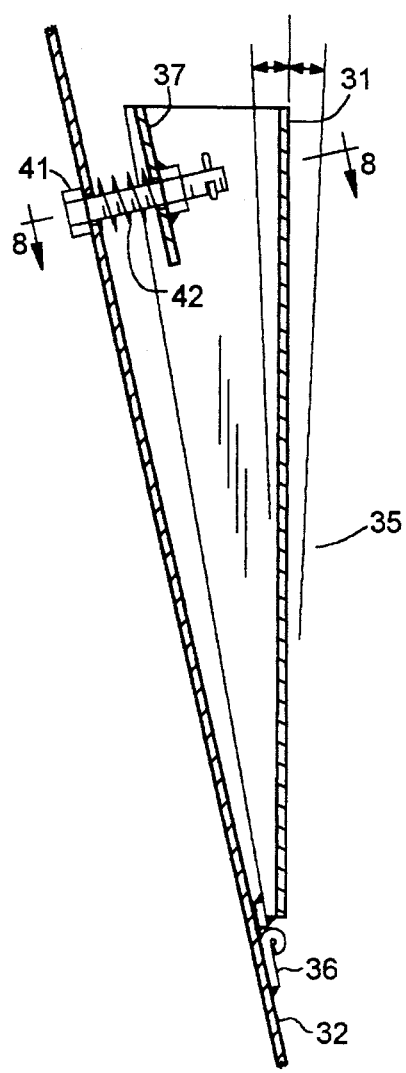
FIG. 7 is a cross-sectional view of an adjustable wedge deflector mounted to the inside surface of the container tub of the mixer in accordance with a further embodiment of the present invention.
Figure 9:
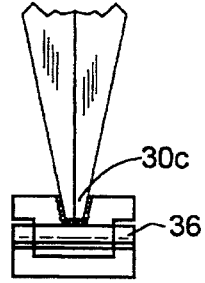
FIG. 9 is an enlarged fragmentary view showing the hinge portion of the adjustable wedge deflector for mounting the adjustable wedge deflector in accordance with the present invention.
Figure 8:
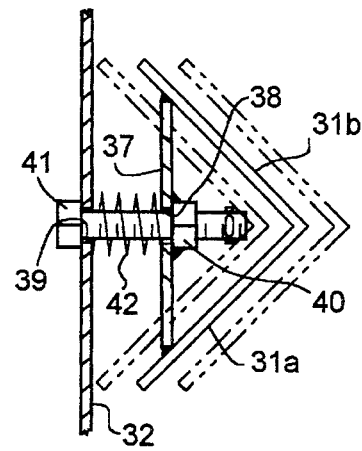
FIG. 8 is a sectional view taken along lines 8—8 in FIG. 7.
Figure 10:
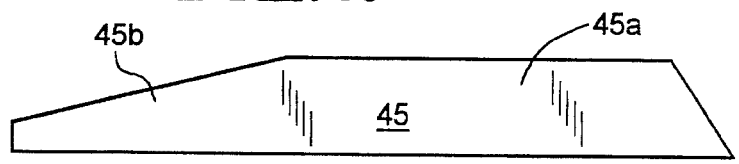
FIG. 10 is a frontal view of the kicker plate in accordance with the present invention.

In FIGS. 7–9, an adjustable wedge deflection member 35 in accordance with the present invention is illustrated. As shown in FIGS. 8 and 9, the adjustable wedge deflection member 35 includes a hinge member 36 mounted to the tapered end portion 30c, which anchors and mounts the wedge deflection member 35 to the interior surface 32 of the container tub 12, as will hereinafter be described. The adjustable wedge deflection member 35, as illustrated in FIGS. 7–9, is similar in shape and cross-section to the wedge deflection member 30 described in FIGS. 5 and 6. However, each leg 31a and 31b of the base 31 includes a reinforcing member 37 extending laterally therebetween, as shown in FIG. 8. The reinforcing member 37 has an opening 38 therein which is substantially aligned with an opening 39 in the container tub 12 when the deflection member 35 is mounted to the interior surface 36, as shown in FIG. 7. The interior surface 37a of the reinforcing member 37 includes a nut member 40 securely attached thereto and overlying the opening 38 in the reinforcing member 37. A bolt member 41 is inserted through opening 39 through a spring member 42 and is engaged and received by nut member 40 to securely anchor the base end 31 of the wedge deflector 35 to the container tub 12. By adjusting the bolt member 41 inwardly and outwardly, the adjustable wedge deflection member 35 may be adjusted inwardly and biased outwardly by spring member 42 with respect to the container tub interior surface 32. This is adjustable and biasing movement is illustrated in FIGS. 7 and 8, as shown in the dotted lines 35a and 35b.

As shown in FIGS. 7 and 9, the hinge member 36 is fixedly attached to the tapered end portion 30c of the adjustable wedge deflection member 35 and is firmly mounted to the interior container tub surface 32. The hinge member 36 permits the inward and outward adjustment of the adjustable wedge deflection member 35, as previously discussed above.

Figure 3A:
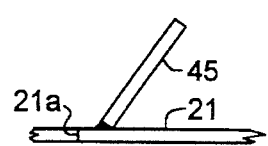
FIG. 3a is a sectional view taken along lines 3a—3a in FIG. 3.

In accordance with the present invention it is preferred that the upper surface of the wing extension member 21 of the lower flighting portion 20 includes a deflector or kicker plate 45 mounted at an angle adjacent to the leading edge 21a to feed the cut material into the auger flighting to facilitate mixing. The kicker plate member 45 is further illustrated in FIG. 9 and is a few inches in length and, preferably, is about three inches in length. As illustrated in FIGS. 3 and 3a, the kicker plate 45 is mounted adjacent to the leading edge 21a of the wing extension member 21 of the lower flighting portion 20 at an angle "b" of between about 25 to 45 degrees with respect to the leading edge 21a. It has been found that an angle of approximately 35 degrees provides the optimum deflection of the cut material into the auger flighting to facilitate mixing. Also, as shown in FIG. 3a, the kicker plate 45 is raised at an angle with respect to the surface of the wing extension member 21 to provide the deflection of the cut material into the auger flighting. In FIG. 9, the preferred configuration of the kicker plate is substantially a quadrangular planar shape. The kicker plate 45 includes a deflection portion 45a and a funneling portion 45b which deflects and directs the cut material towards the center of the auger flighting for enhanced mixing action. However, it is within the scope of the present invention that the kicker plate may be substantially rectangular in shape to deflect and direct the cut material into the center of the auger flighting.

I claim:

1. In a mixer having an auger flighting member mounted and rotating within a vertical feed mixer, the improvement comprising:

a plurality of knife members secured to the auger flighting member and extending radially outwardly therefrom, with said top knife member being attached secured to the trailing end portion of the auger screw flighting member and extending radially outwardly therefrom, with said trailing end portion of the auger flighting member being bent upwardly between about 15 to 25 degrees from the plane of the auger flighting member.

2. The mixer in accordance with claim 1 wherein said trailing end portion of the auger flighting member is bent upwardly at about 22 degrees from the plane of the auger flighting member.

3. The mixer in accordance with claim 1, wherein the auger flighting member is comprised of a lower flighting portion, a central flighting portion and an upper flighting portion, with each of said flighting portions being continuous with respect to one another and spirally wound about a central auger cylinder.

4. The mixer in accordance with claim 3, wherein said plurality of knife members are secured to said central flighting portion and said upper flighting portion.

5. The mixer in accordance with claim 1 wherein said plurality of knife members are replaceably secured to the auger flighting member.

6. A mixer for mixing bales of material comprising:

a container tub having a floor;

an auger flighting member rotating within said container tub, a plurality of knife members secured to the auger flighting member and extending radially outwardly therefrom, with said top knife member being attached secured to the trailing end portion of the auger screw flighting member and extending radially outwardly therefrom, with said trailing end portion of the auger flighting member being bent upwardly between about 15 to 25 degrees from the plane of the auger flighting member: and a plurality of wedge deflection members positioned radially about the interior surface of said container tub to facilitate directing the cut materials into the rotating auger flighting member to facilitate mixing within the mixer.

7. The mixer in accordance with claim 6, wherein the plurality of wedge deflection members are comprised of at least three wedge deflection members.

8. The mixer in accordance with claim 7, wherein said at least three wedge deflection members are tapered and equally spaced and mounted about the interior surface of the container tub at a distance of about 11 inches from said floor of the container tub.

9. The mixer in accordance with claim 6, wherein the plurality of wedge deflection members are adjustable and movable with respect to the interior surface of said container tub.

10. The mixer in accordance with the claim 9, wherein each of said wedge deflection members are hingedly mounted about the interior surface of the container tub and adjustable with respect to the interior surface of the said container tub.

11. The mixer in accordance with claim 10, wherein each of said wedge deflection members includes an adjustment means comprising a bolt member and nut means secured to said wedge deflection members, with said bolt member extending through an opening in said container tub and engageable with said nut means to movably adjust said deflection members with respect to the interior surface of said container tub.

12. The mixer in accordance with claim 11, wherein said adjustment means includes a spring member positioned about said bolt member between said wedge deflection members and said container tub to bias said deflection members to an inward position away from the interior surface of said container tub.

13. The mixer in accordance with claim 6, wherein said plurality of wedge deflection members are spring loaded into the container tub to facilitate directing the cut baled material into the rotating auger flighting member to facilitate mixing.

14. The mixer in accordance with claim 6, wherein said the wedge deflection members are of an L-shaped tapered configuration extending about 12 to 16 inches in length, with each leg of the end opposite the tapered end being about 2 inches in length.

15. A mixer for mixing bales of material, comprising:

a container tub having a floor;

a rotating auger flighting member positioned uprightly within said container tub and comprised of an auger cylinder member having a lower flighting portion, a central flighting portion and an upper flighting portion, with each of said flighting portions being continuous with respect to one another and spirally wound about said auger cylinder member, with said lower flighting portion having a leading edge cooperating with the floor of said tub; and a kicker plate member mounted at an angle with respect to said lower flighting portion to feed the cut material into said auger flighting member to facilitate mixing.

16. The mixer in accordance with claim 15, wherein said container tub is substantially circular in configuration.

17. The mixer in accordance with claim 15, wherein said container tub includes a first end, a second end and sidewalls extending between said first and second ends.

18. The mixer in accordance with claim 15, wherein said kicker plate is mounted at an angle of between about 15 to 25 degrees with respect to said leading edge of said lower flighting portion.

19. The mixer in accordance with claim 18, wherein said kicker plate is mounted at an angle of about 22 degrees with respect to said leading edge of said lower flighting portion.

20. The mixer in accordance with claim 15, wherein said central flighting portion and said upper flighting portion each have a radial width that is constant to form a parallel cylindrical configuration.

21. The mixer in accordance with claim 20, wherein said kicker plate extending from said leading edge of said lower flighting portion substantially covers the exposed floor of said container floor.

22. The mixer in accordance with claim 21, wherein said radial width of said lower flighting portion is substantially constant from said leading edge to a point where said radial width intersects a line substantially parallel to a radial extended from the tangent of said radial width of said central and upper flighting portions.

\* \* \* \* \*